US00RE49895E

(19) United States
(12) Reissued Patent
Schwall et al.

(10) Patent Number: US RE49,895 E
(45) **Date of Reissued Patent: *Apr. 2, 2024**

(54) THERMALLY TEMPERED GLASS ELEMENT AND USE THEREOF

(71) Applicant: SCHOTT AG, Mainz (DE)

(72) Inventors: Michael Schwall, Mainz (DE); Christian Mix, Mainz (DE); Jochen Alkemper, Klein-Winternheim (DE); Peter Thomas, Koblenz (DE)

(73) Assignee: SCHOTT AG, Mainz (DE)

( * ) Notice: This patent is subject to a terminal disclaimer.

(21) Appl. No.: 17/526,434

(22) Filed: Nov. 15, 2021

Related U.S. Patent Documents

Reissue of:
(64) Patent No.: 11,021,390
Issued: Jun. 1, 2021
Appl. No.: 16/663,788
Filed: Oct. 25, 2019

U.S. Applications:
(62) Division of application No. 15/360,370, filed on Nov. 23, 2016, now Pat. No. 10,494,293.

(30) Foreign Application Priority Data

Nov. 26, 2015 (DE) ..... 102015120568.8
Jan. 22, 2016 (DE) ..... 102016101090.1

(51) Int. Cl.
*C03C 3/097* (2006.01)
*C03B 32/02* (2006.01)
*C03C 8/24* (2006.01)

(52) U.S. Cl.
CPC ..... *C03C 3/097* (2013.01); *C03B 32/02* (2013.01); *C03C 8/24* (2013.01)

(58) Field of Classification Search
None
See application file for complete search history.

(56) References Cited

U.S. PATENT DOCUMENTS 4,259,118 A 3/1981 Sack
5,459,110 A 10/1995 Brix
(Continued)

FOREIGN PATENT DOCUMENTS

CN 1285325 2/2001
CN 1803683 7/2006
(Continued)

OTHER PUBLICATIONS

Tian, "New Glass Technology", China Light Industry Press, pp. 240-243 and 251, Jun. 30, 2009, with English translation.
(Continued)

*Primary Examiner* — Carlos N Lopez
(74) *Attorney, Agent, or Firm* — Ruggiero McAllister & McMahon LLC

(57) ABSTRACT

A thermally tempered glass element is provided made of glass with two opposite faces that are under compressive stress of at least 40 MPa. The glass has a working point at which the glass has a viscosity of $10^4$ dPa·s of at most 1350° C. The glass has a viscosity versus temperature profile and a coefficient of thermal expansion versus temperature profile of the glass are such that a variable $(750° C.-T_{13})/(CTE_{Liq}-CTEs_{Sol})$ has a value of at most $5*10^6$ $K^2$. The $CTE_{Liq}$ is a coefficient of linear thermal expansion of the glass above a glass transition temperature $T_g$, the $CTE_{Sol}$ is a coefficient of linear thermal expansion of the glass in a temperature range from 20° C. to 300° C., and the $T_{13}$ is a temperature at which the glass has a viscosity of $10^{13}$ dPa·s.

36 Claims, 2 Drawing Sheets

(56) References Cited

U.S. PATENT DOCUMENTS

| | | | | |
|---|---|---|---|---|
| 5,599,753 | A | 2/1997 | Watzke | |
| 5,656,558 | A | 8/1997 | Brix | |
| 5,736,476 | A | 4/1998 | Watzke | |
| 5,763,343 | A | 6/1998 | Brix | |
| 5,908,703 | A | 6/1999 | Brix | |
| 6,417,124 | B1 | 7/2002 | Peuchert | |
| 10,494,293 | B2 * | 12/2019 | Schwall | C03C 3/097 |
| 2005/0101469 | A1 | 5/2005 | Peuchert | |
| 2005/0145241 | A1 | 7/2005 | Jordens | |
| 2011/0098172 | A1 | 4/2011 | Brix | |
| 2013/0011650 | A1 | 1/2013 | Akiba | |
| 2015/0107575 | A1 | 4/2015 | Levacova | |
| 2017/0295657 | A1 | 10/2017 | Gross | |

FOREIGN PATENT DOCUMENTS

| | | |
|---|---|---|
| CN | 101717189 | 6/2010 |
| CN | 104261676 | 1/2015 |
| DE | 2756555 | 6/1979 |
| DE | 3714988 | 11/1988 |
| DE | 4325656 | 2/1995 |
| DE | 4430710 | 5/1996 |
| EP | 0638526 | 2/1995 |
| EP | 2338847 | 6/2011 |
| WO | 2015009483 | 1/2015 |
| WO | 2015111524 | 7/2015 |
| WO | 2015127583 | 9/2015 |

OTHER PUBLICATIONS

Karlsson, "The technology of chemical glass strengthening—a review", Glass Techol. : Eur. J. Glass Sci. TYechnol. A, Apr. 2010 51(2) pp. 41-54.

* cited by examiner

THERMALLY TEMPERED GLASS ELEMENT AND USE THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a continuation of U.S. application Ser. No. 15/360,370 filed on Nov. 23, 2016, which claims the benefit under 35 USC 119 of German Application 10 2015 120 568.8 filed on Nov. 26, 2015 and claims the benefit under 35 USC 119 of German Application 10 2016 101 090.1 filed on Jan. 22, 2016, the entire contents of all of which are incorporated herein by reference.

BACKGROUND

1. Field of the Invention

The invention generally relates to tempered glasses. More particularly, the invention relates to thermally tempered glass elements and use thereof.

2. Description of Related Art

Nowadays, borosilicate glasses with low CTE (about 3.3 ppm/K) are being employed as windows in ovens with pyrolysis cleaning function. Because of the low coefficient of linear thermal expansion (CTE), the glass pane has a certain temperature shock resistance. The high breaking strength required for the application as a viewing window may be achieved by thermally tempering the glasses. For this purpose, the glasses are heated above glass transition temperature $T_g$ and quenched. The amount the compressive stress introduced thereby depends on the temperature expansion coefficient and the temperature gradient during the tempering process. The standard borosilicate glass that is usually employed has to be heated to above 750° C. in order to achieve a significant compressive stress (about 60 MPa).

A drawback of the prior art is that after the first pyrolysis cleaning cycle borosilicate glasses with low CTE (about 3.3 ppm/K) lose about 70% of their initial compressive stress by relaxation. Breaking strength also decreases correspondingly. In addition, the relaxation of the glass structure causes so-called compaction effects, that is a change in density which leads to deformations of the glass panes. Additional drawbacks are on the one hand the high temperatures which are necessary for tempering low CTE borosilicate glasses. For example, a temperature of more than 750° C. is required for tempering a borosilicate glass that has a low coefficient of thermal expansion, whereas for soda-lime glasses a temperature of 650° C. is already sufficient to achieve a sufficiently high thermal prestress and hence breaking strength. On the other hand, the low CTE of such a glass is disadvantageous, as it greatly limits the amount of compressive stress that can be introduced using standard tempering furnaces.

DE 4 325 656 C2 describes the production of a tempered glass body that is suitable as a fire safety glass, in a conventional air tempering system. The glass body has a coefficient of thermal expansion between 3 and $6*10^{-6}$ $K^{-1}$, specific thermal stress between 0.3 and 0.5 $N/mm^2/K$, glass transition temperature $T_g$ is between 535° C. and 850° C., and the temperature $T_{13}$ at which the glass has a viscosity of $10^{13}$ dPa·s must be more than 560° C. The softening point according to Littleton, $T_{7.6}$, must be above 830° C., and the working point $T_4$ at which the glass has a viscosity of $10^4$ dPa·s must be below 1300° C. The glass has a composition, in percent by weight on an oxide basis, of 73 to 78, preferably 57 to 64 for $SiO_2$, 11 to 18 for $Al_2O_3$, 5 to 10 for MgO, 5 to 10 for CaO, 9 to 12 of $B_2O_3$, and the sum of components MgO, CaO, SrO, BaO, ZnO, $ZrO_2$ is in a range from 6 to 10 wt %.

WO 2015/009483 A1 describes an alkali-free aluminosilicate glass having a composition, in percent by weight on an oxide basis, of 60 to 70 for $SiO_2$, 13 to 22 for $Al_2O_3$, 0 to 9 for $B_2O_3$, 1 to 6 for MgO, 0 to 5 for CaO, 1 to 5 for BaO, 2 to 12 for ZnO, and 0 to 3 for SrO, with a total content of $Al_2O_3+B_2O_3+ZnO>23$ and with the following relationship applying: $B_2O_3+MgO-CaO-BaO-SrO<6$ wt %. The glass is said to have low thermal expansion and great acid and alkali resistance and to be usable as a cooktop. The glass is said to exhibit low thermal expansion of $<30*10^{-7}$ $K^{-1}$. With these parameters, however, this glass does not lend itself to be thermally tempered, or only slightly. Furthermore, the high content of $Al_2O_3$ tpically causes high $T_{13}$ values which do not allow for the desired tempering in a standard tempering furnace. Moreover, high $Al_2O_3$ contents usually reduce acid resistance.

Furthermore, US 2005/145241 A describes a door of a cooking appliance with pyrolysis function, the door comprising a borosilicate glass pane. The glass pane is coated with a colored layer at least in one surface area. The colored layer is adapted so that the strength of the glass pane is not affected by the coating, i.e. in particular not reduced.

From US 2015/107575 A1, an oven door is known which comprises an outer and an inner glass pane having a composition, on an oxide basis, of 55 to 70 wt % of $SiO_2$, 12 to 25 wt % of $Al_2O_3$, 0 to 0.5 wt % of $B_2O_3$, 0 to 2 wt % of $Li_2O$, 0 to 5 wt % of $Na_2O+K_2O$, 0 to 10 wt % of MgO, from 0 to 15 wt % of CaO, of SrO, and of BaO, 0 to 5 wt % of ZnO, and 5 to 25 of RO, with RO=MgO+CaO+SrO+BaO+ZnO, 0 to 3 wt % of $TiO_2$, and 0 to 4 wt % of $ZrO_2$.

These glasses known from prior art do not yet provide any solution for the problem of providing permanent prestress in a glass pane even at temperatures which occur during pyrolysis cleaning, which glass pane should moreover exhibit high chemical resistance. Chemical resistance is particularly important especially in applications in an oven under the temperatures prevailing there during operation and given the higher chemical reactivity resulting therefrom. The prestress, i.e. compressive stress, should furthermore be easy to produce. This means that the glass should be capable of being sufficiently tempered with the temperature gradients that can be produced in a conventional tempering furnace.

SUMMARY

It is therefore an object of the invention to provide a glass or a glass pane which mitigates the drawbacks of the prior art. The glass or the glass pane of the present invention should be capable of being thermally tempered easily, and the thermal prestress should resist high temperatures, and the glass should furthermore have high chemical resistance.

A further aspect of the invention relates to the use of such a glass as a cooking chamber door or for use as a cooking surface.

The glass according to the invention which achieves the object mentioned above is distinguished by the fact that it has a prestress of at least 40 MPa or is capable of being thermally tempered to obtain such a value, and that this prestress relaxes by less than 10% under thermal treatment (e.g. pyrolysis furnace processes) of up to 500° C. Furthermore, the glass can be produced using standard melting techniques. This in particular implies that the working point, i.e. the temperature at which the glass has a viscosity of $10^4$ dPa·s, is not more than 1350° C. Furthermore, according to one embodiment, the glass has a chemical resistance of HSL=2,3,3 or better. The glasses of the invention moreover exhibit high mechanical resistance.

The above-mentioned requirements are in particular achieved by the fact that a variable $$(750° \text{ C.} - T_{13})/(CTE_{Liq} - CTE_{Sol}) \quad (1)$$

has a value of at most $5*10^6$. In the context of the present invention all temperature data are given in ° C. The above variable has the dimension of a squared temperature (° $C.^2$, or $K^2$). $CTE_{Liq}$ denotes the coefficient of linear thermal expansion of the glass above the glass transition temperature $T_g$, and $CTE_{Sol}$ denotes the coefficient of linear thermal expansion of the glass in a temperature range from 20° C. to 300° C. The specified value is the nominal coefficient of mean linear thermal expansion according to ISO 7991, which is determined in a static measurement. $T_{13}$ is the temperature at the annealing point, that is the temperature at which the glass has a viscosity of $10^{13}$ dPa·s. The parameter $T_g$ is the so-called transformation temperature or glass transition temperature. It is defined by the intersection of the tangents to the two branches of the expansion curve during a measurement with a heating rate of 5 K/min. This corresponds to a measurement according to ISO 7884-8 or DIN 52324, respectively.

Accordingly, the invention relates to a thermally tempered glass element having two opposite faces that are under compressive stress, wherein the compressive stress is at least 40 MPa, wherein the working point at which the glass of the glass element has a viscosity of $10^4$ dPa·s is at most 1350° C., and wherein a viscosity versus temperature profile and a coefficient of thermal expansion versus temperature profile of the glass are such that the variable according to the above relationship (1) has a value of at most $5*10^6$ $K^2$.

According to one embodiment of the invention, an expansion coefficient $CTE_{Sol}$ of the glass in a range from 3.5 to 6 ppm/K ($3.5*10^{-6}$ $K^{-1}$ to $6*10^{-6}$ $K^{-1}$) is used.

With such glasses it is possible to introduce a higher prestress into the glass substrate as compared to usual borosilicate glasses which have an expansion coefficient of 3.3 ppm/K.

According to a further embodiment of the invention, the glass is selected so that in its softened state, i.e. above glass transition temperature $T_g$, it has an expansion coefficient $CTE_{Liq}$ in a range from $11*10^{-6}$ $K^{-1}$ $45*10^{31\ 6}$ $K^{-1}$.

In this way, the glass need not be heated excessively to obtain a high prestress since the glass has a high coefficient of thermal expansion in the softened state. This furthermore causes the heat transfer coefficient to become lower. With a lower heat transfer coefficient it is possible to employ a lower temperature gradient in order to produce a specific prestress.

An additional advantage is that due to the selected higher temperature expansion coefficients in the solid and softened states, the glass substrates of the invention have a fracture pattern rather corresponding to that of safety glass. The fracture pattern of conventionally employed borosilicate glasses having temperature expansion coefficients of about 3.3 ppm/K is not comparable to that of safety glass, which implies a higher risk of injury in the event of glass breakage. This risk is further increased when the prestress of the borosilicate glass has relaxed.

Since the temperature $T_{13}$ is in a range from 600 to 730° C., tempering to obtain a prestress can still be achieved in standard tempering furnaces on the one hand, and on the other relaxation of the prestress during processes with thermal loads of up to 500° C. (e.g. pyrolysis oven programs) is kept below 10% of the initial compressive stress.

According to yet a further embodiment of the invention, the glass additionally has a high density of at least 2.4 grams per cubic centimeter. It has been found that precisely such glasses with high density can be well tempered and are more resistant to relaxation of the compressive stress during pyrolysis cleaning.

The glass according to the invention preferably exhibits high chemical resistance. The chemical resistance of glasses is generally specified in three classes, a distinction being made between hydrolytic resistance, acid resistance, and alkali resistance of the glass.

Hydrolytic resistance of a glass is determined and a hydrolytic class is specified according to the regulations of ISO 719 and DIN 12111, respectively. Depending on the quantity of extracted glass constituents, correspondingly tested glasses are classified into classes. Class 1 indicates the class in which only a small amount of material was extracted, and the class number increases with increasing leaching of the glass by hydrolytic attack.

Acid resistance and the acid class of a glass are determined according to the regulations of DIN 12116. Here, again, classification into a class is made according to the amount of extracted glass constituents, and the best class is again Class 1.

Alkali resistance and the alkali class of a glass are determined according to the regulations of ISO 695 and DIN 52322, respectively. Again, the best class, i.e. the one with the highest alkali resistance, is Class 1.

According to one embodiment of the invention, the chemical resistance of glasses of the invention is given by an indication of the class of hydrolytic resistance H, of acid resistance S, and of alkali resistance L of at least 2, 3, 3.

According to yet another embodiment of the invention, the glass element is provided with a coating, preferably a glass flux-based coating, in at least one surface area thereof.

Glass flux-based coatings, also referred to as enamel, produce a strong bond to the substrate due to partial melting of the surface. Thus, they are distinguished by particularly good adhesion as compared to other coatings which do not include such a melting reaction zone. Due to their inorganic nature, the so obtained coatings also exhibit particularly high chemical, thermal and mechanical resistance. However, a drawback of such coatings is that they may susceptibly reduce the strength of a so coated substrate. This is particularly relevant when the substrate exhibits low thermal expansion. In case of an adequately large difference in the coefficients of thermal expansion of the substrate material and of the glass flux-based coating, chipping and cracking may occur. By contrast, an advantageous feature of the glass according to the invention or the glass element according to the invention is that it can be coated with a glass-flux-based coating. In particular, according to a preferred embodiment of the invention the glass element has a coating, preferably a glass flux-based coating, in at least one surface area thereof.

In this case, according to a further preferred embodiment of the invention, the coefficient of thermal expansion of the coating $CTE_{Coat}$ is adapted to the coefficient of thermal expansion of the glass element $CTE_{Sol}$ so that the absolute value of the difference in the coefficients of thermal expansion, $$|\Delta CTE| = |CTE_{Sol} - CTE_{Coat}|,$$

is not more than 1 ppm/K, preferably not more than 0.5 ppm/K, and more preferably not more than 0.3 ppm/K.

A glass element according to the invention which has two opposite faces that are under compressive stress, wherein the compressive stress is at least 40 MPa, and wherein the working point $T_4$ of the glass of which the glass element is made at which the glass has a viscosity of $10^4$ dPa·s is at most 1350° C., and wherein furthermore a viscosity versus temperature profile and a coefficient of thermal expansion versus temperature profile of the glass are such that the variable according to the above relationship (1) has a value of at most $5*10^6$ $K^2$ is suitable for use as a door of a cooking chamber, for example in an electric oven, in particular in an electric oven which has a pyrolysis function. However, it is also possible for such a glass element to be used as a cooking surface. Furthermore, it is possible for the glass element to be used as a cover for heating elements, in particular as a cooking or frying surface, as a cover for heating radiators, as a grilling surface, as a fireplace window, as a carrier sheet or as a furnace lining in ceramic, solar, or pharmaceutical industry or in medical technology, in particular for production processes under high-purity conditions, as a lining of furnaces in which chemical or physical coating processes are performed, or as chemically resistant laboratory equipment, as a substrate for high temperature or extreme low temperature applications, as a furnace windows for combustion furnaces, as a heat shield for shielding hot environments, as a cover for radiators, in particular IR radiators, IR radiators installed in appliances, reflectors, floodlights, projectors, video projectors, photocopiers, for applications with thermo-mechanical load, for example in night vision devices, as a wafer substrate, as a substrate with UV protection, as a material for housing components, for example of electronic devices, and/or cover glasses in IT, such as mobile phones, laptop computers, scanner glasses, etc., as a facade panel, as fire protection glazing, or as a component for ballistic protection.

According to a further embodiment of the invention, the glass element is provided with a coating, at least at one location. Preferably, this at least one coating is a glass flux-based coating, or an enamel.

According to a particularly preferred embodiment of the invention, the coefficient of thermal expansion of the coating $CTE_{Coat}$ is adapted to the coefficient of thermal expansion of the glass element $CTE_{Sol}$ so that the absolute value of the difference in the coefficients of thermal expansion, $$|\Delta CTE| = |CTE_{Sol} - CTE_{Coat}|,$$

is not more than 1 ppm/K, preferably not more than 0.5 ppm/K, and more preferably not more than 0.3 ppm/K.

According to one embodiment of the invention, the glass element has a thickness of greater than or equal to 2 mm and less than or equal to 5 mm, preferably between at least 3 mm and at most 5 mm.

Exemplary Embodiment 1

A composition range of a glass according to one embodiment of the invention is given by the following composition, in wt %:

| | |
|---|---|
| $SiO_2$ | 60-80 |
| $B_2O_3$ | 4-15 |
| $Al_2O_3$ | 3-15 |
| $Li_2O$ | 0-5 |
| $Na_2O$ | 0-10 |
| $K_2O$ | 0-6 |
| MgO | 0-8 |
| CaO | 0-10 |
| SrO | 0-5 |
| $TiO_2$ | 0-5 |
| $ZrO_2$ | 0-9. |

Exemplary Embodiment 2

According to another embodiment of the invention, a further composition range of a glass is given by the following composition, in wt %:

| | |
|---|---|
| $SiO_2$ | 63-75 |
| $Al_2O_3$ | 8-21 |
| $Li_2O$ | 0-5 |
| $Na_2O$ | 0-14 |
| $K_2O$ | 0-5 |
| MgO | 0-12 |
| CaO | 0-18 |
| SrO | 0-5 |
| $TiO_2$ | 0-5 |
| $ZrO_2$ | 0-9. |

Exemplary Embodiment 3

According to yet another embodiment of the invention, a further composition range of a glass is given by the following composition, in wt %:

| | |
|---|---|
| $SiO_2$ | 50-70 |
| $B_2O_3$ | 0-8 |
| $Al_2O_3$ | 3-25 |
| $Li_2O$ | 0-8 |
| $Na_2O$ | 0-7 |
| $K_2O$ | 0-5 |
| MgO | 0-5 |
| CaO | 0-7 |
| SrO | 0-5 |
| ZnO | 0-3 |
| $TiO_2$ | 0-5 |
| $ZrO_2$ | 0-5 |
| $P_2O_5$ | 0-5. |

Furthermore, the glasses may contain minor constituents and/or traces, for example in the form of necessary processing-related additives such as, for example, refining agents, such as $SnO_2$, $CeO_2$, $As_2O_3$, Cl, F, or sulfates, or agents for adjusting an appropriate color, and further constituents such as impurities resulting from traces inevitably contained in the raw materials. These further constituents usually amount to a total of less than 2 wt %.

The following table lists the compositions and properties of three glasses according to the invention together with two comparative examples:

TABLE 1

| Example | Glass 1 | Glass 2 | Glass 3 | Comparative example 1 | Comparative example 2 |
|---|---|---|---|---|---|
| $SiO_2$ | 70.7 | 64.0 | 62.0 | 80.7 | 49.45 |
| $B_2O_3$ | | | 10.0 | 12.7 | 14.15 |
| $Al_2O_3$ | 11.7 | 20.7 | 12.0 | 2.5 | 11.40 |
| $Li_2O$ | | 6.0 | | | |
| $Na_2O$ | 7.1 | 0.5 | 4.0 | 3.5 | |
| $K_2O$ | | 0.2 | 1.5 | 0.6 | |
| MgO | 5.9 | 2.3 | 3.5 | | |
| CaO | 4.6 | | 3.0 | | |
| SrO | | | 4.0 | | |
| BaO | | | | | 24.05 |
| ZnO | | 1.0 | | | |
| $TiO_2$ | | 1.7 | | | |
| $ZrO_2$ | | 1.7 | | | |
| $P_2O_5$ | | 1.2 | | | |
| $Nd_2O_3$ | | 0.3 | | | |
| $SnO_2$ | | 0.4 | | | |
| $As_2O_3$ | | | | | 1.0 |
| NaCl | | | | 1.5 | |
| F | | | | | |
| $CTE_{Sol}$ [1E−6/K] | 5.8 | 4.65 | 4.05 | 3.25 | 4.5 |
| $CTE_{Liq}$ [1E−6/K] | 25 | 29 | 42 | 9.7 | 40 |
| $T_g$ [° C.] | 688 | 616 | 610 | 525 | 662 |
| $T_{13}$ [° C.] | 698 | 631 | 625 | 560 | 663 |
| $T_4$ [° C.] | 1297 | 1198 | 1176 | 1270 | 1215 |
| Density [g/cm$^3$] | 2.44 | 2.46 | 2.46 | 2.22 | 2.72 |
| (750° C.-$T_{13}$)/($CTE_{liq}$ - $CTE_{sol}$) [1E6 K$^2$] | 2.7083 | 4.887 | 3.2938 | 29.4574 | 2.4507 |
| H class DIN ISO719 | 1 | 1 | 2 | 1 | 1 |
| H DIN ISO 719 [μg/g] | 16 | 23 | 41 | 8 | 7 |
| S class DIN 12116 | 2 | 3 | 3 | 1 | 4 |
| S DIN 12116 [mg/dm$^2$] | 0.8 | 3.9 | 10.4 | 0.4 | 1202 |
| L class DIN ISO 695 | 1 | 1 | 3 | 2 | 3 |
| L DIN ISO 695 [mg/dm$^2$] | 61 | 55 | 212 | 152 | 460 |

Here, the parameter $T_g$ is the so-called transformation temperature or glass transition temperature. It is defined by the intersection of the tangents to the two branches of the expansion curve during a measurement with a heating rate of 5 K/min. This corresponds to a measurement according to ISO 7884-8 and DIN 52324, respectively.

According to a preferred embodiment, the glasses of the invention have a density of more than 2.4 g/cm$^3$, while the density of comparison example 1 is below 2.3 g/cm$^3$.

Furthermore, for the glasses of the invention the value of the above relationship (1) is 4,887*10$^6$ K$^2$ or lower. Comparative example 1, by contrast, has a value of about six times greater than that.

BRIEF DESCRIPTION OF THE DRAWINGS

Below, for a description of the invention in more detail, reference will be made to the accompanying figures. In the figures, the same reference numerals designate the same or equivalent elements.

DETAILED DESCRIPTION

Figure 1:
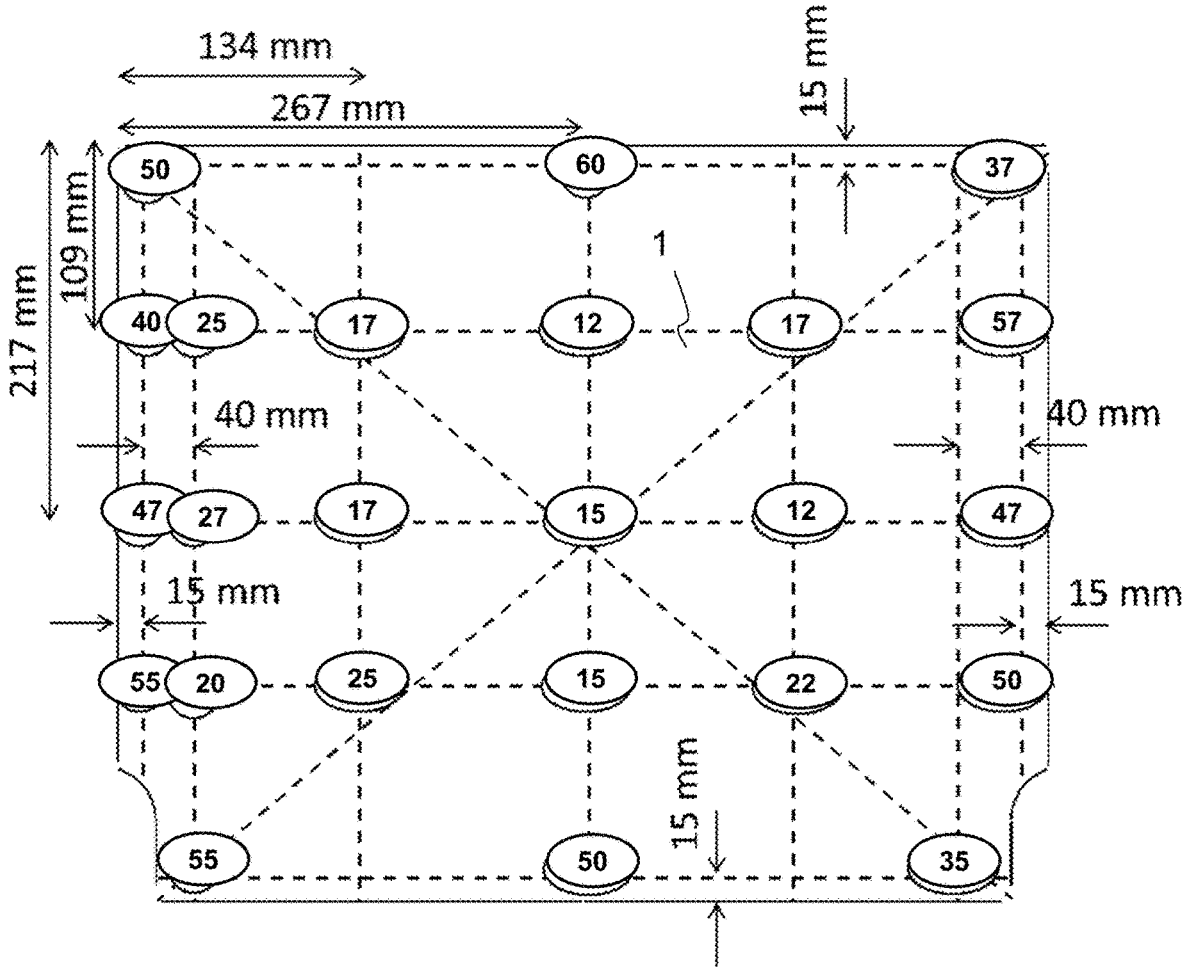
FIG. 1 shows a conventional thermally tempered glass element with measured values of prestress after a pyrolysis cycle.

FIG. 1 shows the outline of a glass element for an oven. The glass pane is made of a borosilicate glass according to the comparative example of the above table. The glass element or the glass pane was subjected to a temperature treatment corresponding to the temperature load after two pyrolysis cleaning cycles.

The numbers in the oval fields indicate the residual prestress measured at the location of the respective field. As can be seen, prestress, i.e. compressive stress, is still quite high at the edge of the pane, with more than 50 MPa, but decreases significantly towards the center. In the center of the pane only 17 MPa are left. Thus, the prestress drops to less than half of the original value after only a short time.

Figure 2:
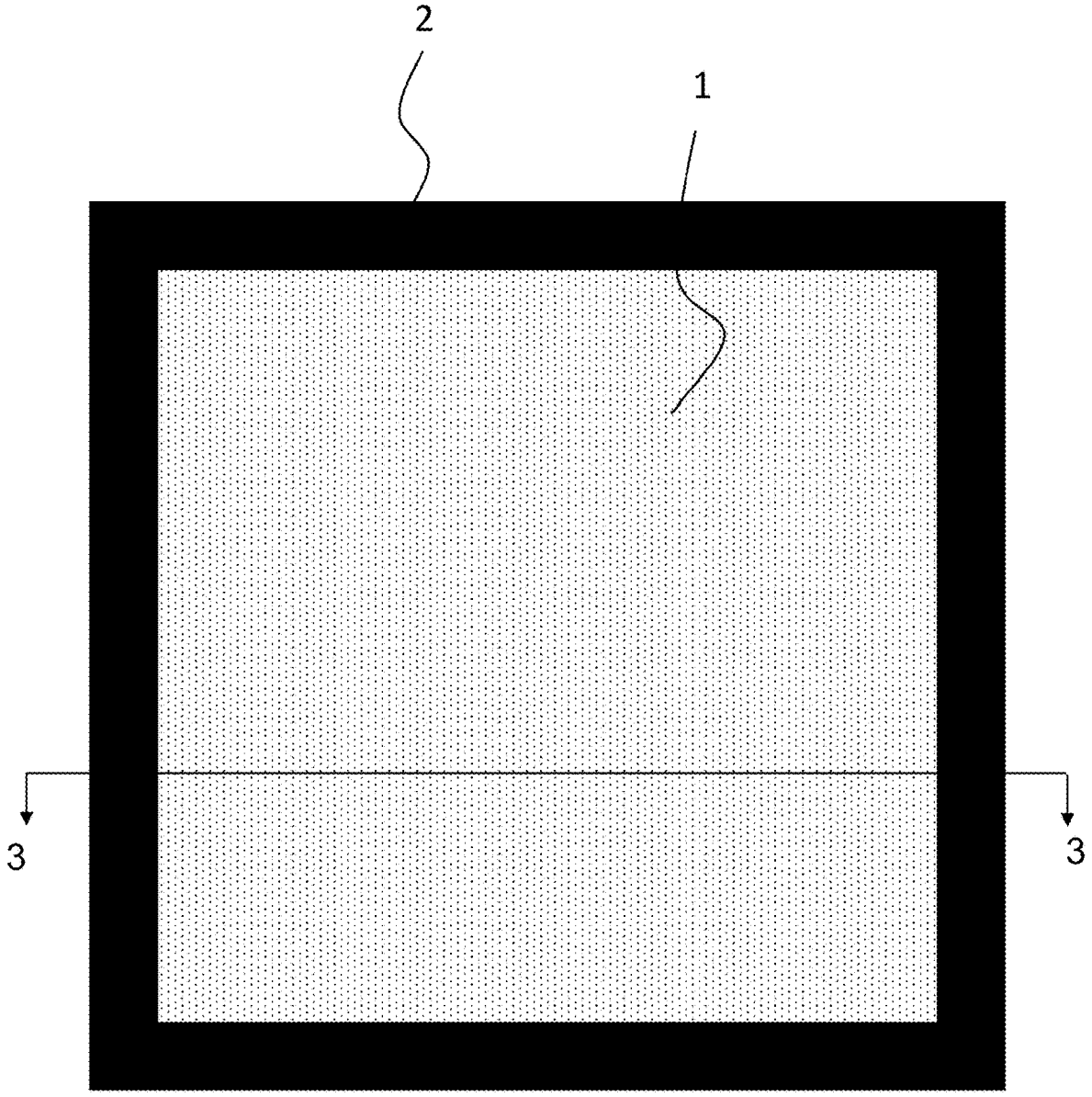
FIG. 2 shows a top plan view of a glass element according to the invention, which is provided with a coating in one area.
Figure 3:
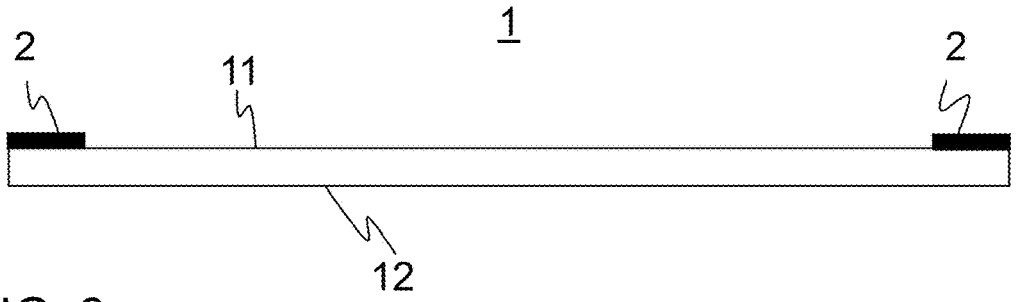
FIG. 3 shows a sectional view of the glass element of FIG. 2 taken along line 3-3.

FIG. 2 schematically illustrates a glass element 1 according to the invention, here shown with a coating applied in a surface area 2 of the glass element 1, by way of example. FIG. 2 shows a top plan view of the glass element 1, while FIG. 3 shows a sectional side view along section line 3-3.

The glass element 1 according to the invention has been thermally tempered and has two opposite faces 11 and 12 that are under compressive stress, the compressive stress being at least 40 MPa. Furthermore, the working point, i.e. the temperature $T_4$ at which the glass of which the glass element 1 is made has a viscosity of 10$^4$ dPa·s, is at most 1350° C. The glass exhibits a viscosity versus temperature profile and a coefficient of thermal expansion versus temperature profile such that the variable $$(750°\ C.-T_{13})/(CTE_{Liq}-CTE_{Sol})$$

has a value of at most 5*10$^6$ K$^2$, wherein $CTE_{Liq}$ is the coefficient of linear thermal expansion of the glass above the glass transition temperature $T_g$, $CTE_{Sol}$ is the coefficient of linear thermal expansion of the glass in a temperature range from 20° C. to 300° C., and $T_{13}$ is the temperature at which the glass has a viscosity of 10$^{13}$ dPa·s.

The coefficient of thermal expansion $CTE_{Sol}$ of the glass in the temperature range from 20° C. to 300° C. is preferably in a range from 3.5*10$^{-6}$ K$^{-1}$ to 6*10$^{-6}$ K$^{-1}$.

Furthermore preferably, the glass is selected so that in its softened state, i.e. above glass transition temperature $T_g$, the glass has an expansion coefficient $CTE_{Liq}$ in a range from $11*10^{-6}$ $K^{-1}$ to $45*10^{-6}$ $K^{-1}$.

According to a further embodiment of the invention, the glass element is distinguished by the fact that the glass has a density of at least 2.4 grams per cubic centimeter.

According to a further embodiment of the invention, the glass element 1 has a thickness between at least 2 mm and at most 5 mm, preferably between greater than or equal to 3 mm and less than or equal to 5 mm.

According to yet another embodiment of the invention, the glass exhibits chemical resistance H, S, L of at least 2, 3, 3 or better, the chemical resistance being defined as hydrolytic class H according to ISO 719, acid class S according to DIN 12116, and alkali class L according to ISO 695.

Furthermore, according to a further embodiment of the invention the glass element 1 may be provided with a coating in at least one surface area 2 thereof, as illustrated by way of example here. Preferably, such a coating is a glass flux-based coating, also known as enamel.

According to a preferred embodiment of the invention, the coefficient of thermal expansion of the coating $CTE_{Coat}$ is adapted to the coefficient of thermal expansion $CTE_{Sol}$ of the glass element so that an absolute value of the difference of the thermal expansion coefficients, $$|\Delta CTE|=|CTE_{Sol}-CTE_{Coat}|,$$

is not more than 1 ppm/K, preferably not more than 0.5 ppm/K, and more preferably not more than 0.3 ppm/K.

However, more generally, without being limited to the example shown in FIG. 2, the glass element 1 may as well be provided without such a coating.

LIST OF REFERENCE NUMERALS

1 Glass element
11, 12 Faces of glass element
2 Coated area of the glass element

What is claimed is:

1. A thermally tempered glass element, comprising:

glass with two opposite faces that are under compressive stress of at least 40 MPa, wherein the glass has a working point at which the glass has a viscosity of $10^4$ dPa·s of at most 1350° C., wherein the glass has a viscosity versus temperature profile and a coefficient of thermal expansion versus temperature profile of the glass are such that a variable $$(750° C.-T_{13})/(CTE_{Liq}-CTE_{Sol})$$

has a value of at most $5*10^6$ $K^2$, wherein $CTE_{Liq}$ is a coefficient of linear thermal expansion of the glass above a glass transition temperature $T_g$, wherein $CTE_{Sol}$ is a coefficient of linear thermal expansion of the glass in a temperature range from 20° C. to 300° C., wherein $T_{13}$ is a temperature at which the glass has a viscosity of $10^{13}$ dPa·s, and wherein the glass has a composition that is free of $B_2O_3$, and wherein the glass has a chemical resistance H, S, L of at least 2, 3, 3 or better, the chemical resistance being defined as hydrolytic class H according to ISO 719, acid class S according to DIN 12116, and alkali class L according to ISO 695.

2. The glass element of claim 1, wherein the coefficient of linear thermal expansion $CTE_{Sol}$ is in a range from $3.5*10^{-6}$ $K^{-1}$ to $6*10^{-6}$ $K^{-1}$.

3. The glass element of claim 1, wherein the coefficient of linear thermal expansion $CTE_{Liq}$ is in a range from $11*10^{-6}$ $K^{-1}$ to $45*10^{-6}$ $K^{-1}$.

4. The glass element of claim 1, wherein the glass has a density of at least 2.4 grams per cubic centimeter.

5. The glass element of claim 1, further comprising a coating on at least one of the two opposite faces.

6. The glass element of claim 5, wherein the coating is a glass flux-based coating.

7. The glass element of claim 5, wherein the coating has a coefficient of thermal expansion, $CTE_{Coat}$, is adapted to the coefficient of thermal expansion $CTE_{Sol}$ of the glass so that an absolute value of a difference of thermal expansion coefficients, $|\Delta CTE|=|CTE_{Sol}-CTE_{Coat}|$, is not more than 1 ppm/K.

8. The glass element of claim 7, wherein the difference is not more than 0.5 ppm/K.

9. The glass element of claim 7, wherein the difference is not more than 0.3 ppm/K.

10. The glass element of claim 1, further comprising a thickness between the two faces that is between greater than or equal to 2 mm and less than or equal to 5 mm.

11. The glass element of claim 1, further comprising a thickness between the two faces that is between greater than or equal to 3 mm and less than or equal to 5 mm.

12. The glass element of claim 1, wherein the composition, in percent by weight, comprises:

| | |
|---|---|
| $SiO_2$ | 60-80, |
| $Al_2O_3$ | 3-15, |
| $Li_2O$ | 0-5, |
| $Na_2O$ | 0-10, |
| $K_2O$ | 0-6, |
| MgO | 0-8, |
| CaO | 0-10, |
| SrO | 0-5, |
| $TiO_2$ | 0-5, and |
| $ZrO_2$ | 0-9. |

13. The glass element of claim 12, wherein the composition further comprises one *or* more elements selected from a group consisting of refining agents, coloring agents, trace impurities inevitably contained in raw materials, and any combinations thereof, and wherein the one or more elements amount to a total of less than 2 wt %.

14. The glass element of claim 1, wherein the composition, in percent by weight, comprises:

| | |
|---|---|
| $SiO_2$ | 63-75, |
| $Al_2O_3$ | 8-21, |
| $Li_2O$ | 0-5, |
| $Na_2O$ | 0-14, |
| $K_2O$ | 0-5, |
| MgO | 0-12, |
| CaO | 0-18, |
| SrO | 0-5, |
| $TiO_2$ | 0-5, and |
| $ZrO_2$ | 0-9. |

15. The glass element of claim 14, wherein the composition further comprises one *or* more elements selected from a group consisting of refining agents, coloring agents, trace impurities inevitably contained in raw materials, and any combinations thereof, and wherein the one or more elements amount to a total of less than 2 wt %.

16. The glass element of claim 1, wherein the composition, in percent by weight, comprises:

| | |
|---|---|
| $SiO_2$ | 50-70, |
| $Al_2O_3$ | 3-25, |
| $Li_2O$ | 0-8, |
| $Na_2O$ | 0-7, |
| $K_2O$ | 0-5, |
| MgO | 0-5, |
| CaO | 0-7, |
| SrO | 0-5, |
| ZnO | 0-3, |
| $TiO_2$ | 0-5, |
| $ZrO_2$ | 0-5, and |
| $P_2O_5$ | 0-5. |

17. The glass element of claim 16, wherein the composition further comprises one *or* more elements selected from a group consisting of refining agents, coloring agents, trace impurities inevitably contained in raw materials, and any combinations thereof, and wherein the one or more elements amount to a total of less than 2 wt %.

18. The glass element of claim 1, wherein the glass with two opposite faces is configured for a use selected from a group consisting of a door of a cooking chamber, a door of an electric oven, a door of an electric oven having a pyrolysis function, a cooking surface, a cover for a heating element, a cooking surface, a frying surface, a cover for a heating radiator, a grilling surface, a fireplace window, a carrier sheet, a furnace lining, a solar device, a pharmaceutical device, a medical device, a furnace lining for chemical or physical coating processes, a chemically resistant laboratory equipment, a substrate for high temperature applications, a substrate for extreme low temperature applications, a combustion furnace window, a heat shield for hot environment, a cover for a radiator, an IR radiator, an IR radiator appliance, a reflector, a floodlight, a projector, a video projector, a photocopier, thermo-mechanical load device, a night vision device, a wafer substrate, UV protection substrate, a housing component, an electronic device housing, a cover glass, a mobile phone cover glass, a laptop computer cover glass, a scanner cover glass, a facade panel, a fire protection glazing, and a ballistic protection component.

*19. A thermally tempered glass element, comprising:*

*glass with two opposite faces that are under compressive stress of at least 40 MPa,*

*wherein the glass has a working point at which the glass has a viscosity of $10^4$ dPa·s of at most 1350° C.,*

*wherein the glass has a viscosity versus temperature profile and a coefficient of thermal expansion versus temperature profile of the glass are such that a variable*

$$(750°\ C.-T_{13})/(CTE_{Liq}-CTE_{Sol})$$

*has a value of at most $5*10^6$ $K^2$,*

*wherein $CTE_{Liq}$ is a coefficient of linear thermal expansion of the glass above a glass transition temperature $T_g$,*

*wherein $CTE_{Sol}$ is a coefficient of linear thermal expansion of the glass in a temperature range from 20° C. to 300° C.,*

*wherein $T_{13}$ is a temperature at which the glass has a viscosity of $10^{13}$ dPa·s, and*

*wherein the composition comprises $B_2O_3$, less than 70 wt.-% of $SiO_2$, and is free of BaO.*

*20. The glass element as claimed in claim 19, wherein the glass has a chemical resistance H, S, L of at least 2, 3, 3 or better, the chemical resistance being defined as hydrolytic class H according to ISO 719, acid class S according to DIN 12116, and alkali class L according to ISO 695.*

*21. The glass element as claimed in claim 19, wherein the coefficient of linear thermal expansion $CTE_{Sol}$ is in a range from $3.5*10^{-6}$ $K^{-1}$ to $6*10^{-6}$ $K^{-1}$.*

*22. The glass element as claimed in claim 19, wherein the coefficient of linear thermal expansion $CTE_{Liq}$ is in a range from $11*10^{-6}$ $K^{-1}$ to $45*10^{-6}$ $K^{-1}$.*

*23. The glass element as claimed in claim 19, wherein the glass has a density of at least 2.4 grams per cubic centimeter.*

*24. The glass element as claimed in claim 19, further comprising a coating on at least one of the two opposite faces.*

*25. The glass element as claimed in claim 24, wherein the coating is a glass flux-based coating.*

*26. The glass element as claimed in claim 24, wherein the coating has a coefficient of thermal expansion, $CTE_{Coat}$, is adapted to the coefficient of thermal expansion $CTE_{Sol}$ of of the glass so that an absolute value of a difference of thermal expansion coefficients, $|\Delta CTE|=|CTE_{Sol}-CTE_{Coat}|$, is not more than 1 ppm/K.*

*27. The glass element as claimed in claim 26, wherein the difference is not more than 0.5 ppm/K.*

*28. The glass element as claimed in claim 26, wherein the difference is not more than 0.3 ppm/K.*

*29. The glass element as claimed in claim 19, further comprising a thickness between the two faces that is between greater than or equal to 2 mm and less than or equal to 5 mm.*

*30. The glass element as claimed in claim 19, further comprising a thickness between the two faces that is between greater than or equal to 3 mm and less than or equal to 5 mm.*

*31. The glass element as claimed in claim 19, wherein the glass has a content of $Al_2O_3$ being in the range of from 3 to 25 wt %.*

*32. The glass element as claimed in claim 19, wherein the glass has a composition, in percent by weight, comprising:*

*$SiO_2$ 60 to less than 70,*
*$B_2O_3$ 4-15,*
*$Al_2O_3$ 3-15,*
*$Li_2O$ 0-5,*
*$Na_2O$ 0-10,*
*$K_2O$ 0-6,*
*MgO 0-8,*
*CaO 0-10,*
*SrO 0-5,*
*$TiO_2$ 0-5, and*
*$ZrO_2$ 0-9.*

*33. The glass element as claimed in claim 32, wherein the composition further comprises one or more elements selected from the group consisting of refining agents, coloring agents, trace impurities inevitably contained in raw materials, and any combinations thereof, and wherein the one or more elements amount to a total of less than 2 wt %.*

*34. The glass element as claimed in claim 19, wherein the glass has a composition, in percent by weight, comprising:*

*$SiO_2$ 50 to less than 70,*
*$B_2O_3$ from greater than 0 to 8,*
*$Al_2O_3$ 3-25,*
*$Li_2O$ 0-8,*
*$Na_2O$ 0-7,*
*$K_2O$ 0-5,*
*MgO 0-5,*
*CaO 0-7,*
*SrO 0-5,*

*ZnO 0-3,*
*$TiO_2$ 0-5,*
*$ZrO_2$ 0-5, and*
*$P_2O_5$ 0-5.*

*35. The glass element as claimed in claim 34, wherein the composition further comprises one or more elements selected from the group consisting of refining agents, coloring agents, trace impurities inevitably contained in raw materials, and any combinations thereof, and wherein the one or more elements amount to a total of less than 2 wt %.*

*36. The glass element as claimed in claim 19, wherein the glass with two opposite faces is configured for a use selected from the group consisting of a door of a cooking chamber, a door of an electric oven, a door of an electric oven having a pyrolysis function, a cooking surface, a cover for a heating element, a cooking surface, a frying surface, a cover for a heating radiator, a grilling surface, a fireplace window, a carrier sheet, a furnace lining, a solar device, a pharmaceutical device, a medical device, a furnace lining for chemical or physical coating processes, a chemically resistant laboratory equipment, a substrate for high temperature applications, a substrate for extreme low temperature applications, a combustion furnace window, a heat shield for hot environment, a cover for a radiator, an IR radiator, an IR radiator appliance, a reflector, a floodlight, a projector, a video projector, a photocopier, thermo-mechanical load device, a night vision device, a wafer substrate, UV protection substrate, a housing component, an electronic device housing, a cover glass, a mobile phone cover glass, a laptop computer cover glass, a scanner cover glass, a facade panel, a fire protection glazing, and a ballistic protection component.*

* * * * *